US012239588B2

(12) United States Patent
Cameron

(10) Patent No.: US 12,239,588 B2
(45) Date of Patent: Mar. 4, 2025

(54) COMMODE WHEELCHAIR

(71) Applicant: Neville Cameron, Grayson, GA (US)

(72) Inventor: Neville Cameron, Grayson, GA (US)

( * ) Notice: Subject to any disclaimer, the term of this patent is extended or adjusted under 35 U.S.C. 154(b) by 759 days.

(21) Appl. No.: 17/223,266

(22) Filed: Apr. 6, 2021

(65) Prior Publication Data

US 2021/0315751 A1 Oct. 14, 2021

Related U.S. Application Data

(60) Provisional application No. 63/009,386, filed on Apr. 13, 2020.

(51) Int. Cl.
*A61G 5/10* (2006.01)
*E03D 9/08* (2006.01)

(52) U.S. Cl.
CPC ............. *A61G 5/1002* (2013.01); *E03D 9/08* (2013.01); *A61G 2203/70* (2013.01)

(58) Field of Classification Search
CPC .... A61G 5/1002; A61G 2203/70; A61G 7/02; A61G 7/047; E03D 9/08; A47K 11/04; A47K 11/06; A47K 11/08
See application file for complete search history.

(56) References Cited

U.S. PATENT DOCUMENTS 4,092,984 A * 6/1978 Bindel .................... A61M 3/06 604/276
5,058,222 A * 10/1991 Workman ............ A61G 5/1002 4/456
5,189,745 A * 3/1993 Workman ............ A61G 5/1002 5/604
5,960,484 A * 10/1999 Shao ......................... E03D 9/08 4/420.4
6,209,901 B1 4/2001 Patel
6,665,888 B1 * 12/2003 Kwak .................. A61M 3/022 604/185
8,434,171 B2 * 5/2013 Wang ....................... A61H 3/04 4/237
9,428,898 B1 * 8/2016 Clements .................. E03D 9/08
2003/0181880 A1 * 9/2003 Schwartz ................ A61F 5/442 604/358
2005/0060797 A1 * 3/2005 Gilmore ................. A61G 9/003 4/450
2006/0253967 A1 * 11/2006 Wu ........................ A61H 35/00 4/420.4
2007/0093777 A1 * 4/2007 Chen ......................... E03D 9/08 604/500
2008/0243090 A1 * 10/2008 Tsai .................... A61M 3/0279 604/261

(Continued)

FOREIGN PATENT DOCUMENTS

WO 2018085196 A1 5/2018

*Primary Examiner* — George Sun
(74) *Attorney, Agent, or Firm* — Asgaard Patent Services, LLC; F. Wayne Thompson, Jr.

(57) ABSTRACT

Disclosed is a commode wheelchair, though in some implementations the wheels may be omitted. The exemplary implementation of the commode wheelchair is configured to be positioned above a toilet bowl and includes a digital stimulation device used to induce a bowel movement. Through a waste elimination opening in the seat and without assistance from a caregiver, the user may expel their solid waste into the toilet bowl using the digital stimulation device.

10 Claims, 27 Drawing Sheets

(56) References Cited

U.S. PATENT DOCUMENTS

| | | | | |
|---|---|---|---|---|
| 2010/0162475 | A1* | 7/2010 | Hashidume | E03D 9/08 4/233 |
| 2010/0249730 | A1* | 9/2010 | Beechie | A61M 3/0279 604/275 |
| 2011/0203044 | A1* | 8/2011 | Lim | E03D 9/08 4/447 |
| 2011/0308017 | A1* | 12/2011 | Nakamura | A61G 9/00 5/605 |
| 2012/0030870 | A1* | 2/2012 | Storm | A61G 5/1002 280/47.38 |
| 2012/0084909 | A1* | 4/2012 | Dunn | A47K 11/06 4/483 |
| 2012/0090086 | A1* | 4/2012 | Melone, Jr. | A61G 5/1002 4/480 |
| 2015/0033464 | A1* | 2/2015 | Hauth | E03C 1/102 4/448 |
| 2016/0339166 | A1* | 11/2016 | Adam | A61M 3/0279 |
| 2017/0252506 | A1* | 9/2017 | Frostaa | A61M 3/0295 |
| 2018/0058054 | A1* | 3/2018 | Yoshida | E03D 9/08 |
| 2018/0064295 | A1* | 3/2018 | Okada | A47K 7/04 |
| 2018/0289569 | A1* | 10/2018 | Hara | A61G 7/02 |
| 2019/0159633 | A1* | 5/2019 | Lee | A47K 3/006 |
| 2020/0078510 | A1* | 3/2020 | Henry | A61M 3/0258 |
| 2020/0393475 | A1* | 12/2020 | Hall | A47K 13/24 |
| 2021/0310227 | A1* | 10/2021 | Kramer | H04N 23/56 |
| 2021/0361500 | A1* | 11/2021 | Lai | A61G 5/0816 |
| 2022/0105257 | A1* | 4/2022 | Merz | A61M 1/74 |
| 2022/0183517 | A1* | 6/2022 | Yang | A47K 11/04 |

* cited by examiner

DETAIL C

DETAIL D

DETAIL B

SECTION C-C

DETAIL A

FIG. 18
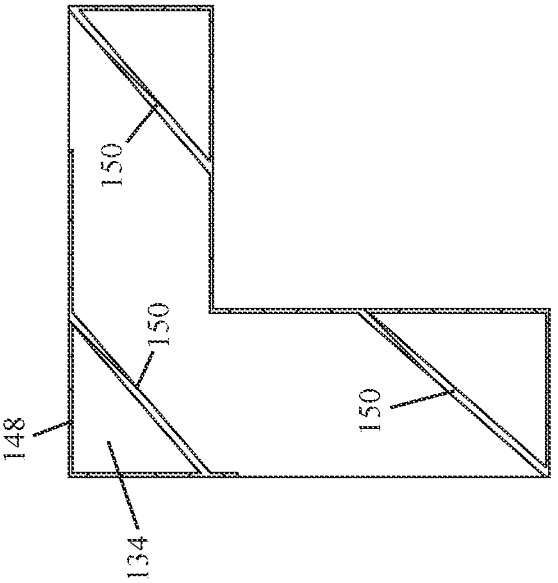
SECTION B-B
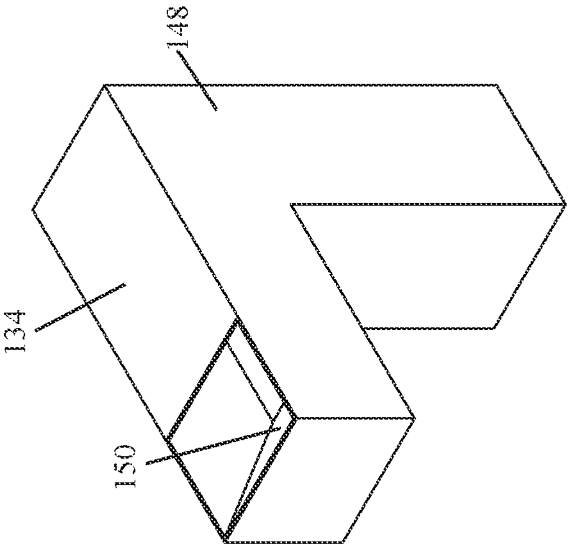
FIG. 16

SECTION A-A

DETAIL B

DETAIL C

FIG. 49
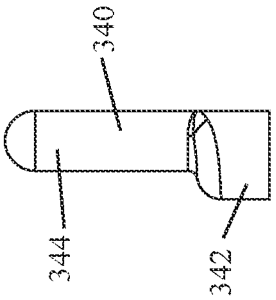
FIG. 51
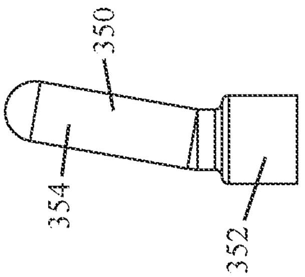
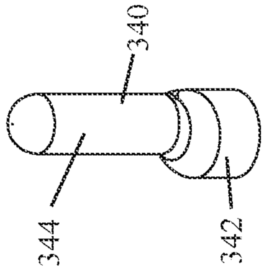
FIG. 48
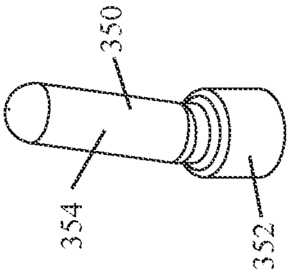
FIG. 50

COMMODE WHEELCHAIR

CROSS REFERENCE TO RELATED APPLICATION

This application claims the benefit of U.S. Provisional Application Ser. No. 63/009,386, filed on Apr. 13, 2020, the entirety of which is incorporated herein by reference.

TECHNICAL FIELD

This disclosure relates to commode wheelchairs configured to be positioned over a toilet bowl to enable a person with a disability to use a toilet. More specifically, the present disclosure relates to commode wheelchairs used in conjunction with a digital stimulation device, the digital stimulation device being used to induce a reflex bowel movement.

BACKGROUND

With a spinal cord injury, damage can occur to the nerves that allows a person to control bowel movements. If the spinal injury occurs at or above the twelfth thoracic vertebra (i.e., the T-12 vertebrae) in the spine, the ability to feel when the rectum is full may be lost. In this case, the bowel will empty by reflex in response to the rectum filling up with stool. Further, those with spinal injuries at or above the T-12 vertebrae have impaired mobility, often being wheelchair bound. Even still, these individuals would be capable of using the commode without assistance if provided with a suitably configured chair and digital stimulation device.

Digital stimulation is a way to induce a bowel movement after a spinal cord injury. Typically, digital stimulation involves inserting a finger, or the working end portion of a "dil" stick, into the rectum and moving it in a circular motion. By doing this, the bowel reflex is stimulated and the anal sphincter muscle relaxes causing the anus to open and stool to leave the body.

Accordingly, it can be seen that needs exist for the commode wheelchair disclosed herein. It is to the provision of a commode wheelchair configured to address these needs, and others, that the present invention is primarily directed.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a commode wheelchair, though in some implementations the wheels may be omitted. The exemplary implementation of the commode wheelchair is configured so that it can be positioned above a toilet bowl and includes a digital stimulation device used to induce a bowel movement. Through a waste elimination opening in the seat, the user may expel their solid waste into the toilet using the digital stimulation device, without assistance from a caregiver.

An example commode chair comprises: a seat with a waste elimination opening and a splash guard, wherein the waste elimination opening is located in a central portion of the seat beneath where the person sits, and the splash guard includes a sidewall positioned around the waste elimination opening that depends from an underside of the seat. The sidewall of the splash guard includes an opening with a flexible diaphragm positioned therein. The flexible diaphragm is configured to support a digital stimulation device. The digital stimulation device includes a shaft that extends through and is supported by the flexible diaphragm.

Another example commode chair comprises: a seat with a waste elimination opening and a splash guard, wherein the waste elimination opening is located in a central portion of the seat beneath where the person sits, and the splash guard includes a sidewall positioned around the waste elimination opening that depends from an underside of the seat; a digital stimulation device used to induce a bowel movement, the digital stimulation device comprising a shaft with a working end portion; and a sliding-pivot assembly configured to hold the digital stimulation device by the shaft, the sliding-pivot assembly comprising a cylindrical body with a sliding-pivot mounted within an interior of the cylindrical body, wherein the sliding-pivot is configured to secure about the shaft of the digital stimulation device. The sidewall of the splash guard includes an opening configured to allow attachment of the sliding-pivot assembly. The sliding-pivot assembly is configured to: position the working end portion of the digital stimulation device beneath the waste elimination opening of the seat, allow the user to insert the working end portion of the digital stimulation device into a rectum, and to move the digital stimulation device in a manner that induces a bowel movement.

Yet another example commode chair comprises: a frame with a bracket; a seat resting on the frame, wherein the seat includes a waste elimination opening in a central portion of the seat beneath where the person sits; a digital stimulation device used to induce a bowel movement, wherein the digital stimulation device comprises a shaft having a working end portion; and a sliding-pivot assembly configured to hold the digital stimulation device by the shaft, wherein the sliding-pivot assembly comprises a cylindrical body with a sliding-pivot mounted within an interior of the cylindrical body, the sliding-pivot is configured to secure about the shaft of the digital stimulation device. The bracket is positioned underneath the seat, depends from a portion of the frame on which the seat rests, and includes an opening configured to allow attachment of the sliding-pivot assembly. The sliding-pivot assembly is configured to: position the working end portion of the digital stimulation device beneath the waste elimination opening of the seat, allow the user to insert the working end portion of the digital stimulation device into a rectum, and to move the digital stimulation device in a manner that induces a bowel movement.

BRIEF DESCRIPTION OF THE DRAWINGS

FIG. 16 illustrates an isometric view of an example periscope that can be attached to the seat of the commode wheelchair shown in FIG. 1.

FIG. 18 illustrates a side cutaway view of the periscope taken along lines B-B shown in FIG. 17.

FIGS. 48 and 49 illustrate another example stimulation attachment for use with the digital stimulation device shown in FIG. 42.

FIGS. 50 and 51 illustrate yet another example stimulation attachment for use with the digital stimulation device shown in FIG. 42.

Like reference numerals refer to corresponding parts throughout the several views of the drawings.

DETAILED DESCRIPTION

Figure 1:
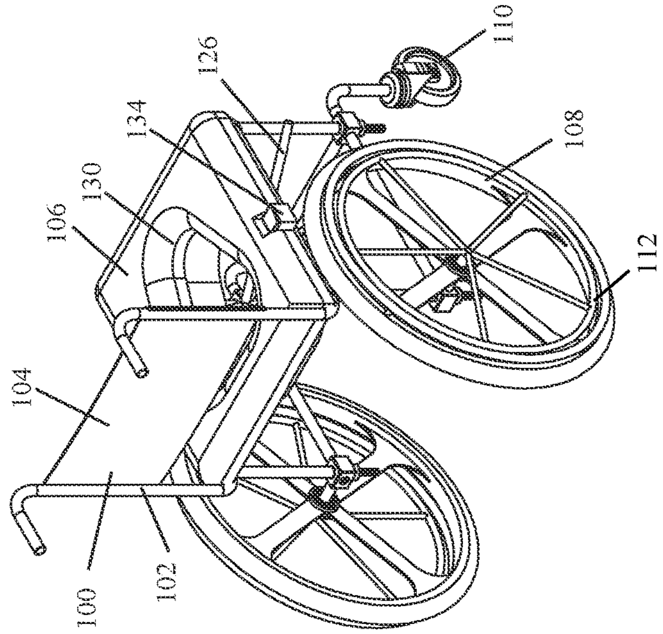
FIG. 1 illustrates an isometric view of an exemplary implementation of a commode wheelchair having a digital stimulation device used to induce a bowel movement.
Figure 2:
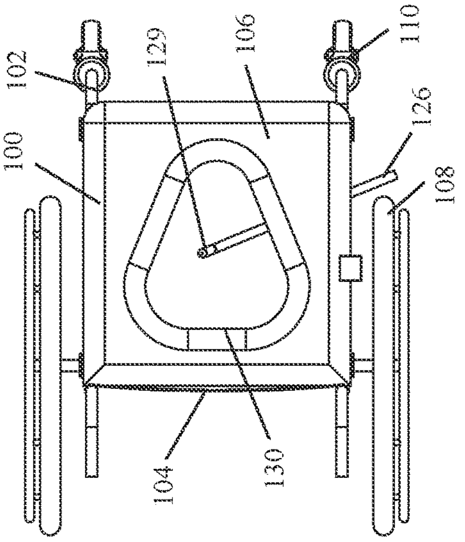
FIG. 2 illustrates a top view of the commode wheelchair shown in FIG. 1.
Figure 3:
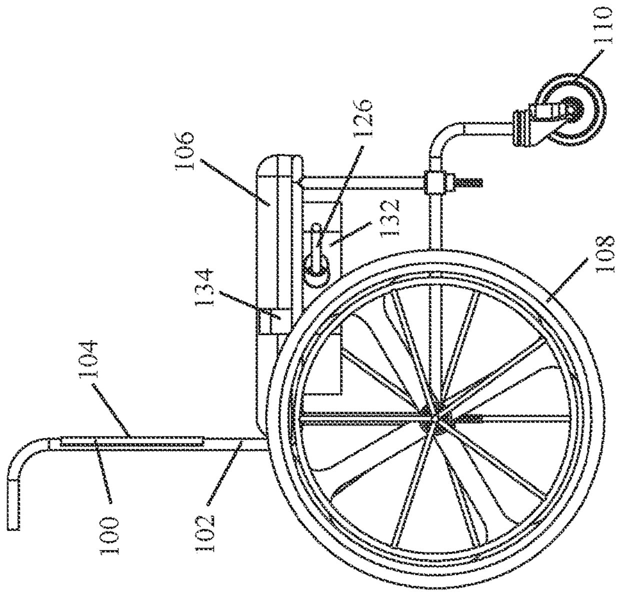
FIG. 3 illustrates a side view of the commode wheelchair shown in FIG. 1.
Figure 5:
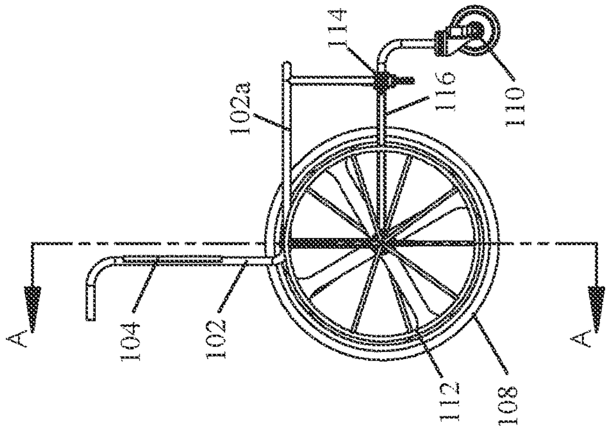
FIG. 5 illustrates a side view of the frame shown in FIG. 4.

FIGS. 1-3 illustrate an exemplary implementation of a commode wheelchair 100 according to the principles of the present disclosure. The commode wheelchair 100 is configured so that it can be wheeled into position above a toilet bowl and includes a digital stimulation device 126 used to induce a bowel movement. Through a waste elimination opening 130 in the seat 106, the user may expel their solid waste into the toilet using the digital stimulation device 126, without assistance from a caregiver.

Figure 40:
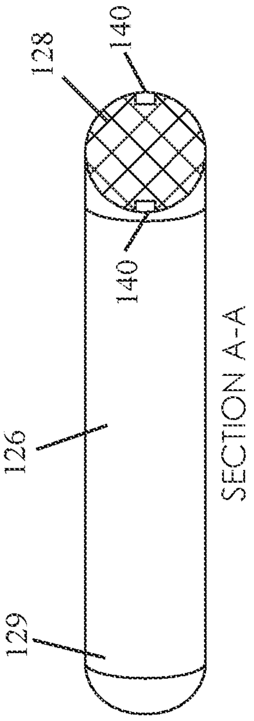
FIG. 40 illustrates a cutaway view of the digital stimulation device taken along lines A-A shown in FIG. 39.
Figure 41:
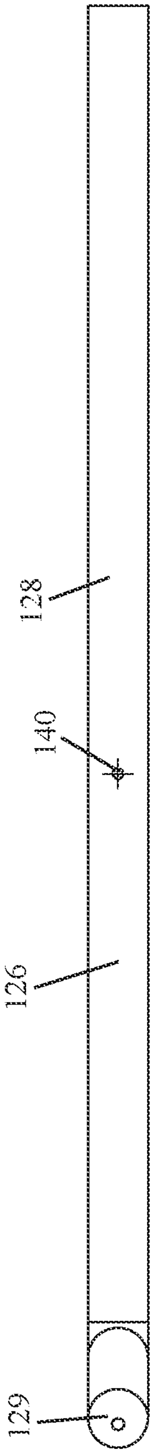
FIG. 41 illustrates a top view of the digital stimulation device shown in FIG. 39.

In general, a digital stimulation device can be used to induce a reflex bowel movement by stimulating the rectal muscles to open and allow stool to exit the body. The example digital stimulation device 126 shown in FIGS. 1-3 and 39-41 comprises a shaft 128 having an angled insertion tip 129 (also referred to as the "working end portion") adapted for insertion into the rectum. The shaft 128 includes two locating holes 140 therein, the purpose of which is discussed in greater detail below. In some implementations, the locating holes 140 are 180 degrees offset from each other (see, e.g., FIG. 40). To induce a bowel movement, the angled insertion tip 129 of the digital stimulation device 126 is inserted into the rectum and moved in a circular motion. This circular motion causes the anal sphincter and bowel muscles to relax and, in turn, allows stool to leave the body. Other example digital stimulation devices are disclosed herein.

As shown in FIGS. 1-3, an exemplary implementation of the commode wheelchair 100 comprises a frame 102, a backrest 104, a seat 106, a pair of wheels 108, and a pair of casters 110. In an alternate implementation, the commode wheelchair 110 could be adapted to include other features commonly associated with a wheelchair (e.g., a pair of arm rest, a pair of foot rest, safety restraints, etc.).

Figure 4:
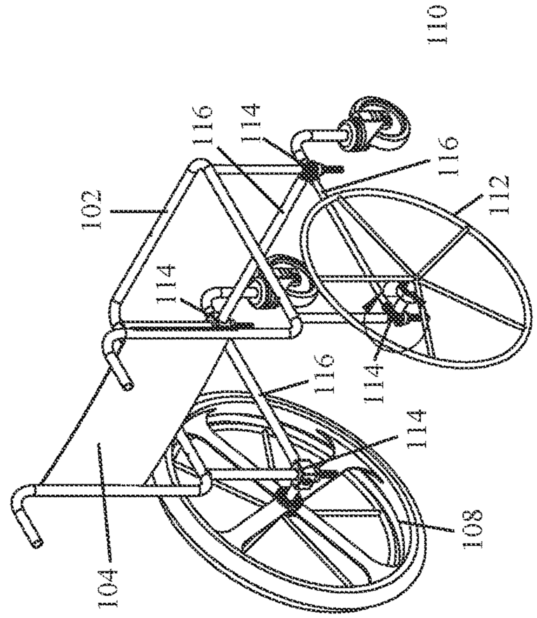
FIG. 4 illustrates an isometric view of an example frame for the commode wheelchair shown in FIG. 1.
Figure 6:
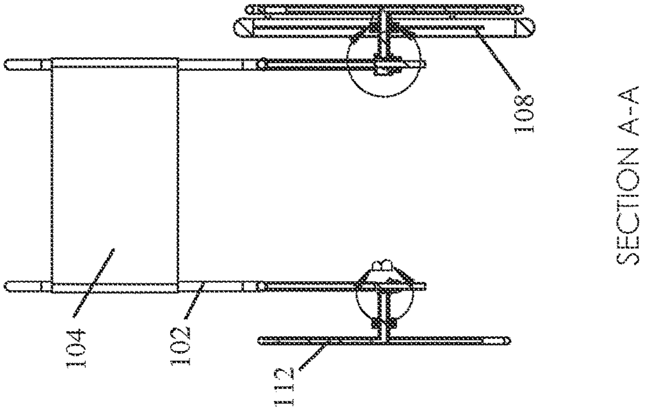
FIG. 6 illustrates a side cutaway view of the frame taken along lines A-A shown in FIG. 5.
Figure 8:
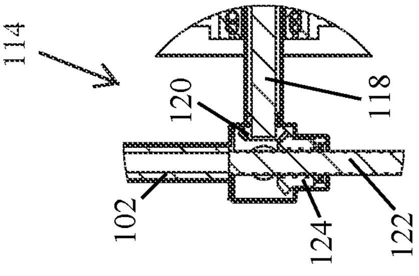
FIG. 8 illustrates an enlarged view of a portion of the frame shown in FIG. 6, wherein a lift mechanism is shown.
Figure 9:
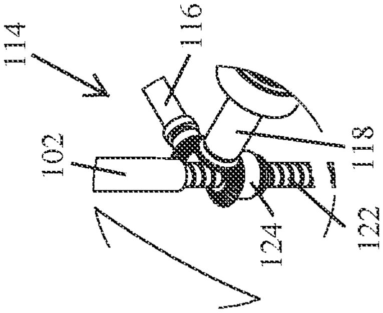
FIG. 9 illustrates an enlarged view of a portion of the frame shown in FIG. 4, wherein a lift mechanism is shown.
Figure 7:
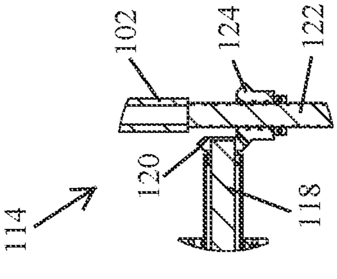
FIG. 7 illustrates an enlarged view of a portion of the frame shown in FIG. 6, wherein a lift mechanism is shown.

As previously mentioned, the frame 102 of the commode wheelchair 100 is configured so that it can be positioned over a toilet bowl. As shown in FIGS. 1, 4, and 6, there is an opening (or gap) between the rear wheels 108 attached to the frame 102 that allows the commode wheelchair 100 to be wheeled into positioned over a toilet bowl. Further, as shown in FIG. 4-9, the frame 102 of the commode wheelchair 110 includes a plurality of lift mechanisms 114 configured to raise and lower the seat 106, and the upper portion 102*a* of the frame 102 to which the seat 106 is attached, to accommodate toilet bowls of varying height.

As shown best in FIG. 4, in some implementations, the frame 102 of the commode wheelchair 100 comprises a rotatable hand crank 112 operably connected to each of four lift mechanisms 114 by a series of transfer shafts 116. The frame 102 is configured so that turning the rotatable hand crank 112 causes each lift mechanism 114 to simultaneously raise, or lower, the seat 106 of the commode wheelchair 100. Or, put another way, actuation of the rotatable hand crank 112 converts torque (i.e., rotation) into linear adjustment of the height of the seat 106. In some implementations, the rotatable hand crank 112 may be positioned adjacent one of the rear wheels 108 (see, e.g., FIG. 1). When rotated, the rotatable hand crank 112 turns a horizontal spindle 118 having a miter gear 120 on a proximal end thereof (see, e.g., FIGS. 7 and 9). The miter gear 120 of the horizontal spindle 118 meshes smoothly with a miter gear nut 124 rotatably secured to a vertical jack screw 122 (see, e.g., FIGS. 7 and 9). Thus, the rotation of the horizontal spindle 118 can drive the miter gear nut 124 in either a clockwise or counter-clockwise rotation. Further, rotation of the miter gear nut 124 drives the rotation of each operably connected transfer shaft 116 and thereby the other connected lift mechanisms 114. In this way, the seat 106 can be raised, or lowered, by rotating the hand crank 112. As discussed above, linear movement of the seat 160 is accomplished using common mechanical screw principles. Also note, the external threads of the vertical jack screw portion 122 of each leg of the frame 102 complement the internal threads of the miter gear nut 124 rotatably secured thereto.

As shown in FIGS. 1-3, the seat 106 of the commode wheelchair 100 can be affixed to the frame 102. As shown in FIGS. 10 and 12-15, an example seat 106 comprises a waste elimination opening 130, a splash guard 132, and in some implementations, a periscope 134. In some implementations, the splash guard 132 is configured so that a sliding-pivot assembly 142 can be removably affixed thereto. The sliding-pivot assembly 142 is used to position a digital stimulation device 126, 226 below the seat 106 of the commode wheelchair 100 (see, e.g., FIG. 10).

As shown best in FIG. 2, the waste elimination opening 130 is in a central portion of the seat 106 beneath where a person sits.

Figure 12:
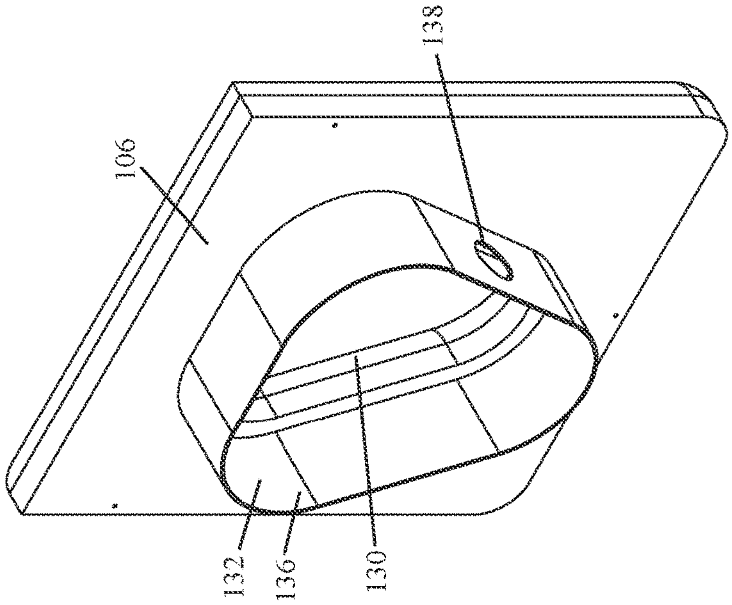
FIG. 12 illustrates an isometric view of the example seat shown in FIG. 10 without any attachments.
Figure 15:
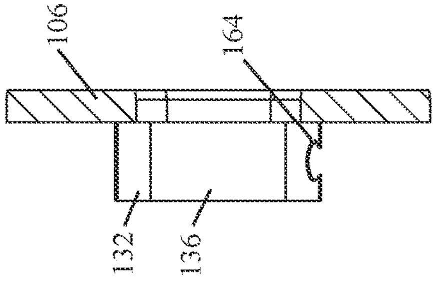
FIG. 15 illustrates a cutaway view of the opening in the splash guard taken along lines C-C shown in FIG. 14.
Figure 14:
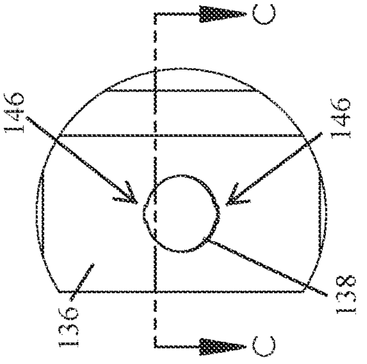
FIG. 14 illustrates an enlarged view of the opening in the splash guard shown in FIG. 13.

As shown in FIG. 12, the splash guard 132 comprises a sidewall 136, positioned about the waste elimination opening 130, that extends from a bottom side of the seat 106. The splash guard 132 includes an opening 138 that extends through the sidewall 136 thereof. The opening 138 is configured so that the sliding-pivot assembly 142, holding a digital stimulation device (126, 226), can be attached thereto (see, e.g., FIG. 10). As shown best in FIGS. 14, the sidewall opening 138 includes tab clearance slots 146, the purpose of which is discussed below.

Although not shown in the drawings, it should be understood that the sidewall opening 138 can support the shaft of a digital stimulation device 126, 226 and serve as a pivot point during use, without a sliding-pivot assembly 142.

Figure 10:
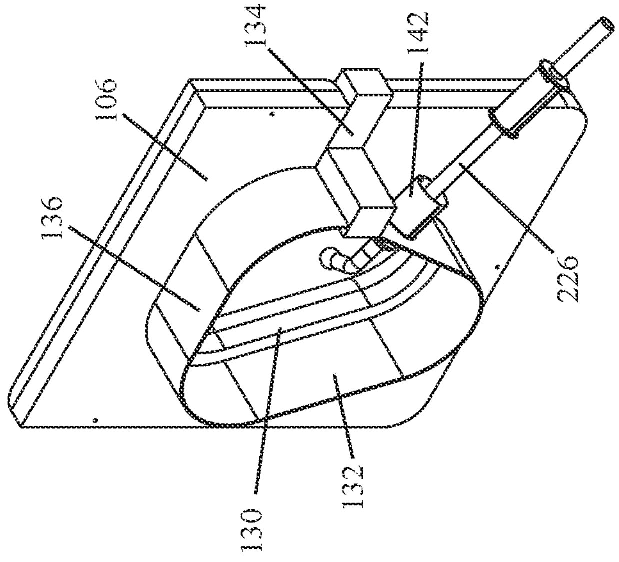
FIG. 10 illustrates a perspective view of an example seat for the commode wheelchair shown in FIG. 1, wherein the seat has a digital stimulation device attached to its splash guard by an example sliding-pivot assembly.
Figure 13:
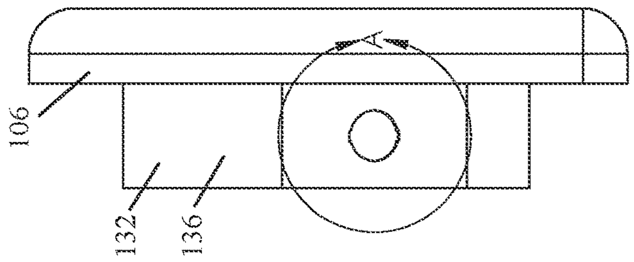
FIG. 13 illustrates a side view of the seat shown in FIG. 12, wherein the opening in the splash guard is shown.
Figure 17:
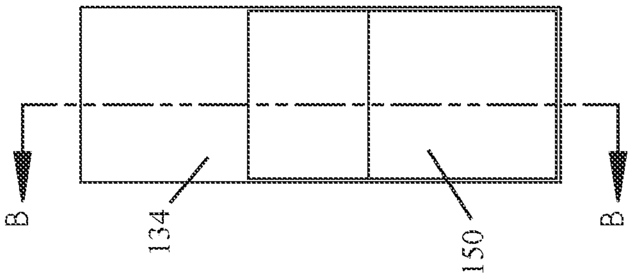
FIG. 17 illustrates a front view of the periscope shown in FIG. 16.

As shown best in FIGS. 1, 3 and 10, the periscope 134 is positioned so that a user resting on the seat 106 of the commode wheelchair 100 is able to view the scene within the chute defined by the splash guard 136. In this way, while attempting to induce a bowel movement, the user may visually direct the use of a digital stimulation device. As shown in FIGS. 16-18, in some implementations, the periscope 134 comprises an L-shaped body 148 having a series of mirrors 150 positioned therein to facilitate its function. One of ordinary skill in the art, having the benefit of the present disclosure, would be able to manufacture the periscope 134 disclosed herein or select a suitable alternative.

Figure 19:
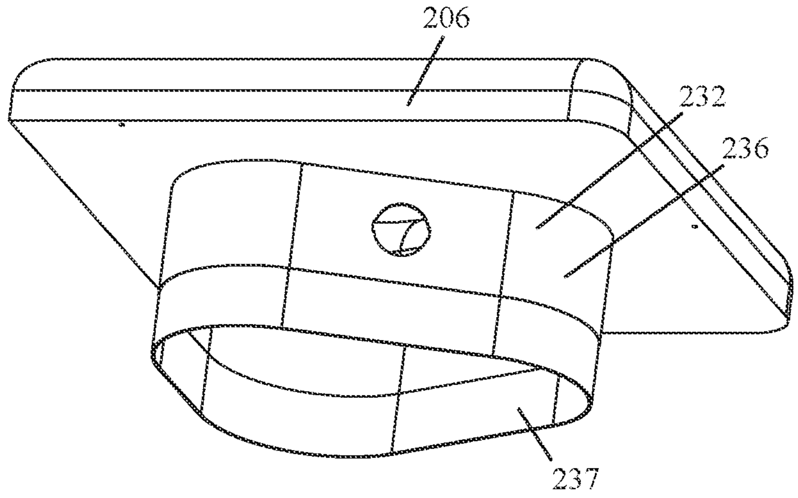
FIG. 19 illustrates another example seat for the commode wheelchair shown in FIG. 1.

FIG. 19 illustrates another example seat 206 for the commode wheelchair 100. The seat 206 is similar to the seat 106 discussed above and shown in FIGS. 12-15, but this seat 206 includes a flexible extension 237 extending from the sidewall 236 of the splash guard 232. The flexible extension 237 is adapted to resiliently deform and inwardly deflect if it makes contact with the interior or exterior edge of a toilet bowl's rim. The flexible extension 237 may be fabricated from a resilient material such as rubber, but could be made of another suitable material or combination of materials.

Figure 11:
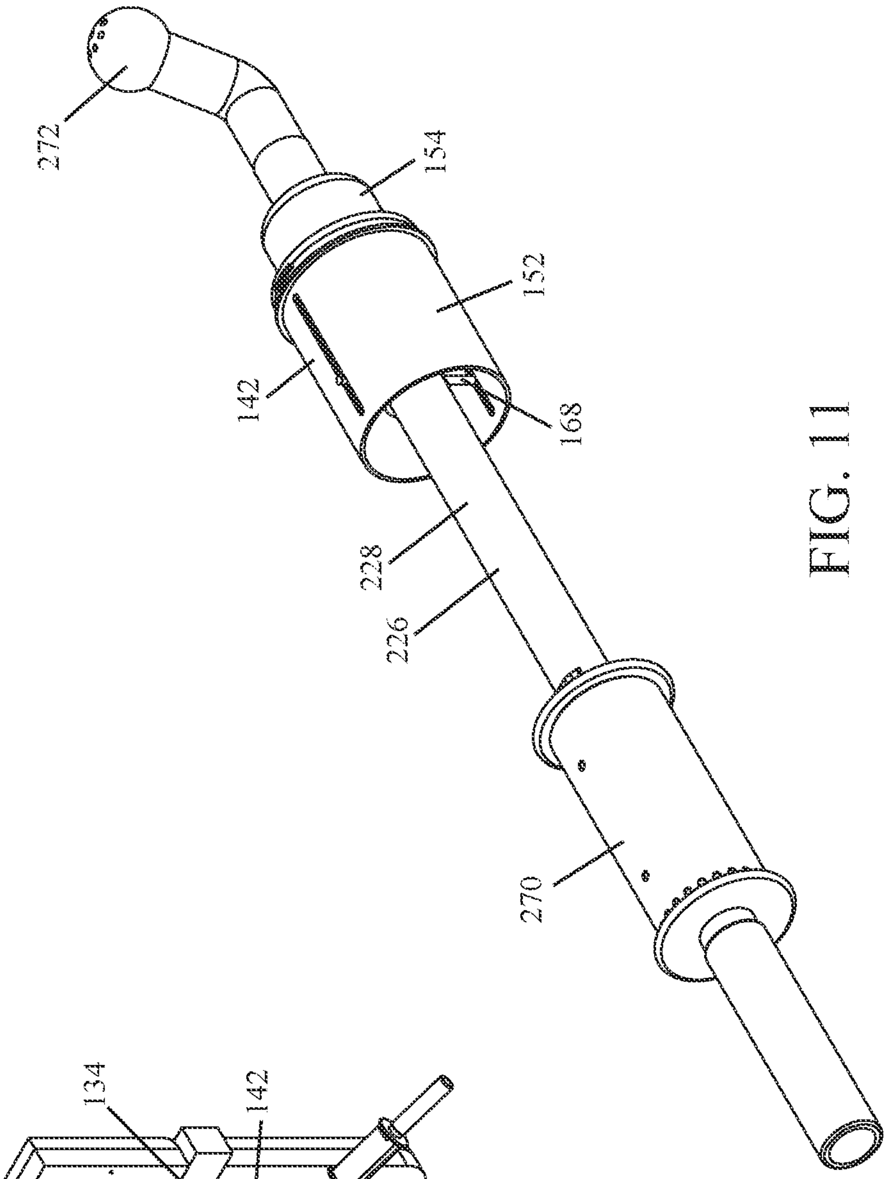
FIG. 11 illustrates an exemplary sliding-pivot assembly with an example digital stimulation device.
Figure 20:
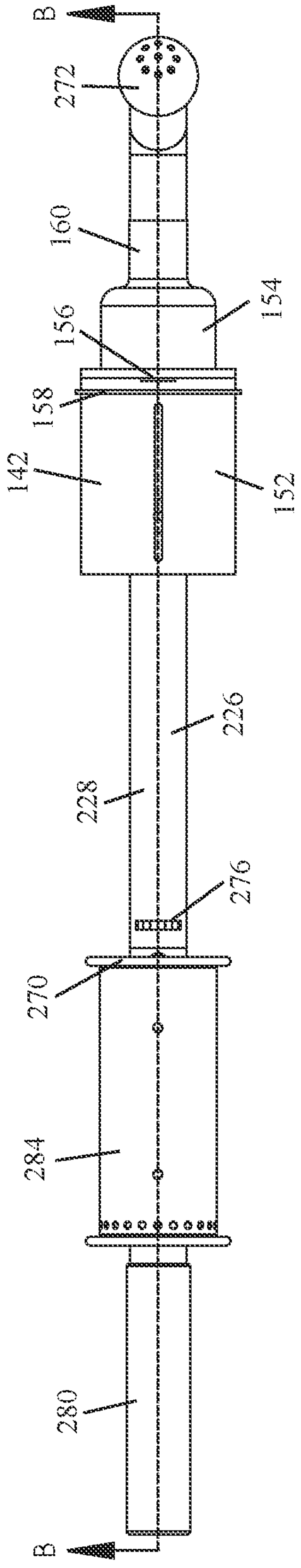
FIG. 20 illustrates another view of the sliding-pivot assembly and digital stimulation device shown in FIG. 11.
Figure 21:
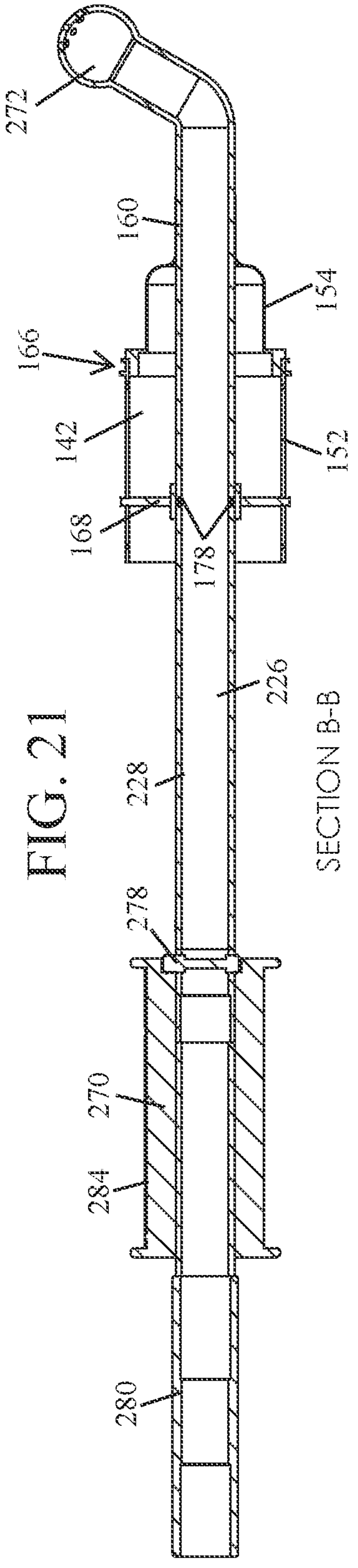
FIG. 21 illustrates a cutaway view of the sliding-pivot assembly and digital stimulation device taken along lines B-B shown in FIG. 20.

FIGS. 11 and 20-21 illustrate a sliding-pivot assembly 142, holding a digital stimulation device 226, that can be secured to the sidewall 136 of the seat 106. The sliding-pivot assembly 142 positions the spray head 272 (also referred to as the "working end portion") of the digital stimulation device 226 below the waste elimination opening 130 in the seat 106 (see, e.g., FIG. 10). Using only a single hand, a user seated on the commode wheelchair 100 can grasp the handle 270 and thereby use the digital stimulation device 226 to induce a bowel movement, without caregiver assistance. More specifically, the sliding-pivot assembly 142 facilitates positioning the spray head 272 of the digital stimulation device 226 below and, if appropriate, into the rectum of a seated user. It should be understood that the exemplary sliding-pivot assembly 142 can be used in conjunction with any digital stimulation device (e.g., 126, 226, 326) disclosed herein.

Figure 22:
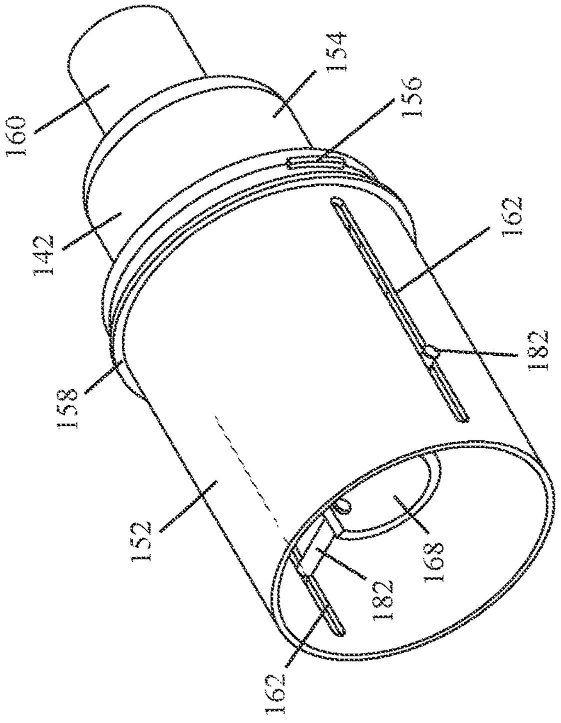
FIGS. 22 and 23 illustrate an exemplary sliding-pivot assembly.
Figure 23:
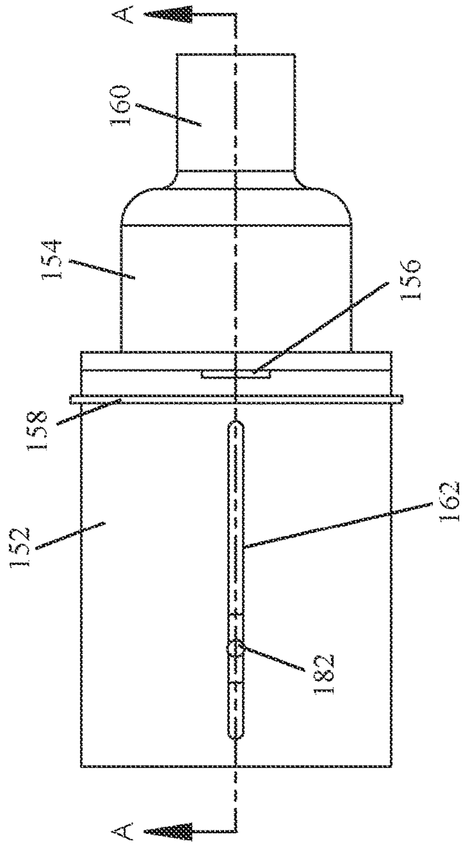
Figure 24:
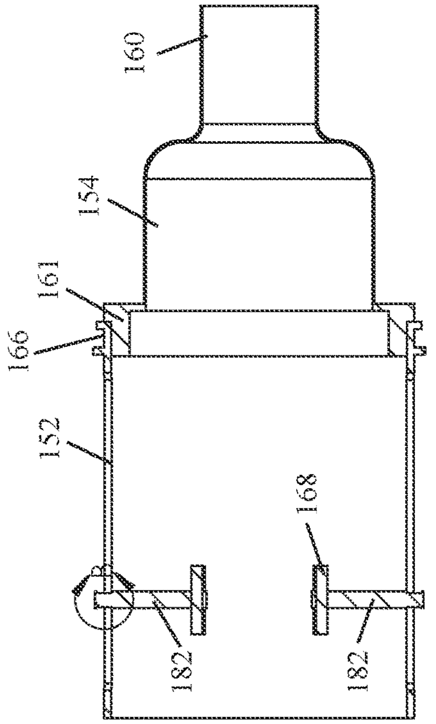
FIG. 24 illustrates a cutaway view of the sliding-pivot assembly taken along lines A-A shown in FIG. 23.

As shown in FIGS. 22-24, an example sliding-pivot assembly 142 comprises a cylindrical body 152 having a rubber boot 154 affixed to a front end thereof. The neck 160 of the rubber boot 154 includes an opening therein that fits about the shaft 228 of the digital stimulation device 226 (see, e.g., FIGS. 21 and 24). When the sliding-pivot assembly 142 is secured to the splash guard 132 of the seat 106, the rubber boot 154 extends through the opening 138 into the chute define by the sidewall 136. The rubber boot 154 is configured to prevent liquid and solid waste exiting the splash guard 132 through the opening 138 therein or by running down the shaft (or handle) of a digital stimulation device. In some implementations, the base 161 of the rubber boot 154 acts as a gasket and is press fit into an opening in the front end of the cylindrical body 152 (see, e.g., FIG. 24).

As shown in FIGS. 22-24 and 26-27, the front end of the cylindrical body 152 includes two outwardly extending tabs 156 and an annular flange 158 thereon. The two tabs 156 are configured to fit through the tab clearance slots 146 of the opening 138 in the splash guard 132 and then be rotated into adjacent detents 164 (see, e.g., FIG. 15). In this way, the cylindrical body 152, and thereby the sliding-pivot assembly 142, can be removably affixed to the splash guard 132 of the seat 106. The annular flange 158 is adapted to prevent over insertion of the cylindrical body 152 during installation on the splash guard 132. Also, the annular flange 158 is spaced from the tabs 156 to form a gap 166 capable of accommodating the sidewall 136 adjacent the opening 138. The cylindrical body 152 also includes two longitudinally extending slots 162, the purpose of which will be discussed below.

Figure 25:
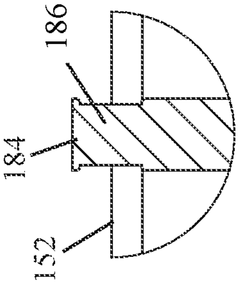
FIG. 25 illustrates an enlarged view of a portion of the sliding-pivot assembly shown in FIG. 24.
Figure 26:
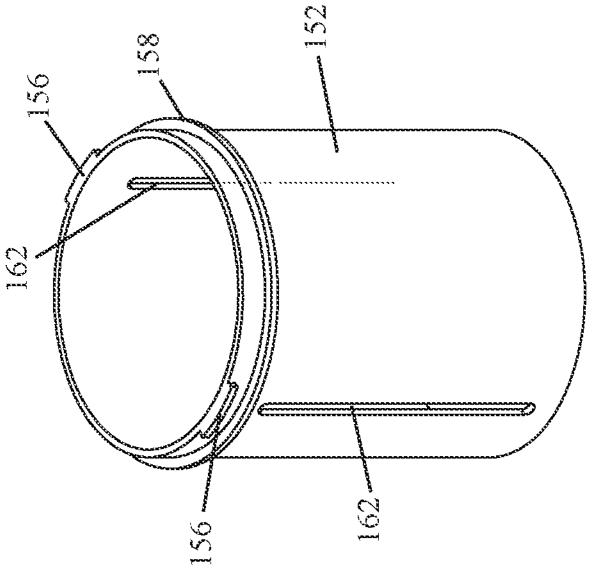
FIGS. 26 and 27 illustrate the cylindrical body of the sliding-pivot assembly shown in FIG. 22.
Figure 27:
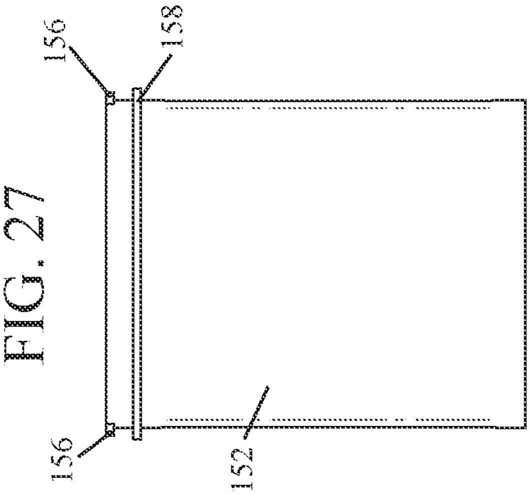
Figure 29:
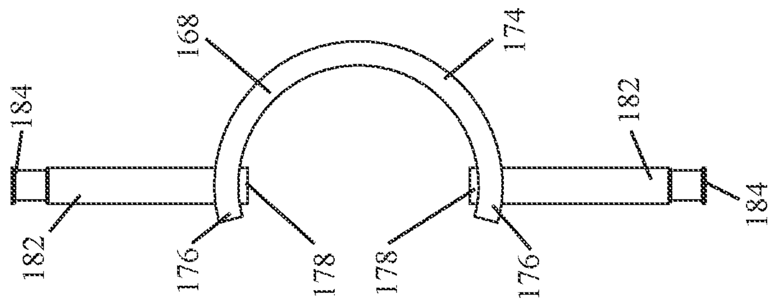
FIG. 29 illustrates a side view of the sliding-pivot shown in FIG. 28.
Figure 28:
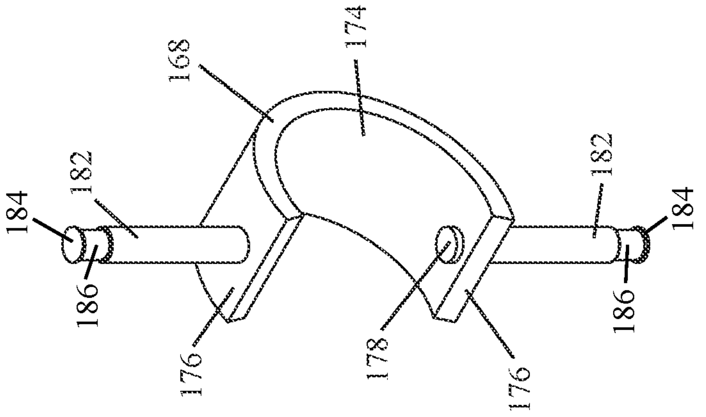
FIG. 28 illustrates an isometric view of the sliding-pivot of the sliding-pivot assembly shown in FIG. 22.

As shown in FIGS. 22 and 24, the sliding-pivot assembly 142 further comprises a sliding-pivot 168 that is mounted within the interior of the cylindrical body 152. As shown best in FIGS. 28 and 29, the sliding-pivot 168 comprises a C-shaped body 174 adapted to secure about the shaft 228 of a digital stimulation device 226 (see, e.g., FIG. 21). The C-shaped body 174 comprises two curved branches 176, each curved branch includes a locating pin 178 thereon. Each locating pin 178 is adapted to be received within locating holes 140, 274 found on the shaft of a digital stimulation device 126, 226. The curved branches 176 of the C-shaped body 174 are configured to resiliently deform and, in conjunction with the locating pins 178 being received within corresponding holes 274, thereby secure about the shaft 228 of the digital stimulation device 226 (see, e.g., FIG. 21). The sliding-pivot 168 is slidably mounted to the cylindrical body 152 by two spokes 182. Each spoke 182 extends from one curved branch 176 of the sliding-pivot 168 and is adapted to be received within one of the longitudinally extending slots 162 in the cylindrical body 152 of the sliding-pivot assembly 142 (see, e.g., FIG. 22). In some implementations, the distal end 184 of each spoke 182 is larger in diameter than the neck portion 186 extending through a longitudinally extending slot 162 (see, e.g., FIG. 25).

FIGS. 10-11, 20-21, and 30-31 illustrate another example digital stimulation device 226 according to the principles of the present disclosure. The digital stimulation device 226 is similar to the digital stimulation device 126 shown in FIGS. 39-41 but is configured to spray water as a means to induce a bowel movement. In this way, the digital stimulation device 226 can be used to induce a bowel movement without penetrating the anus. The digital stimulation device 226 comprises a handle 270 secured to a shaft 228 having an angled spray head 272 adapted to spray water onto the rectum as a means to induce a bowel movement. The shaft 228 includes two locating holes 274 therein. The spray head 272 includes a plurality of small holes therein through which water escapes. A water supply from a sink faucet, or other pressurized source, is supplied via a hose attached to the handle end of the digital stimulation device 226 (not shown). One of ordinary skill in the art, having the benefit of the present disclosure, could select a connector suitable for joining a hose to the digital stimulation device 226. To induce a bowel movement, the spray head 272 is positioned below the anus and used to spray a stream of water onto the area. The warm water spray can cause the anal sphincter and bowel muscles to relax, and in turn, allow stool to leave the body.

Figure 30:
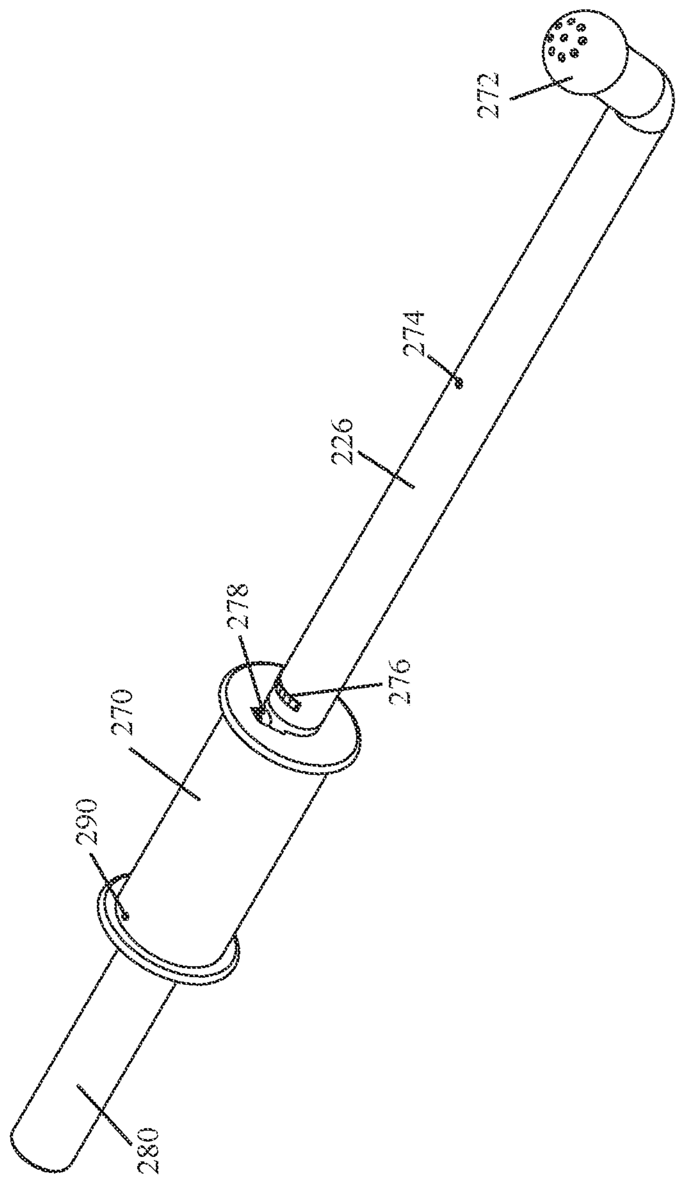
FIGS. 30 and 31 illustrate an example digital stimulation device used to induce a bowel movement.
Figure 31:
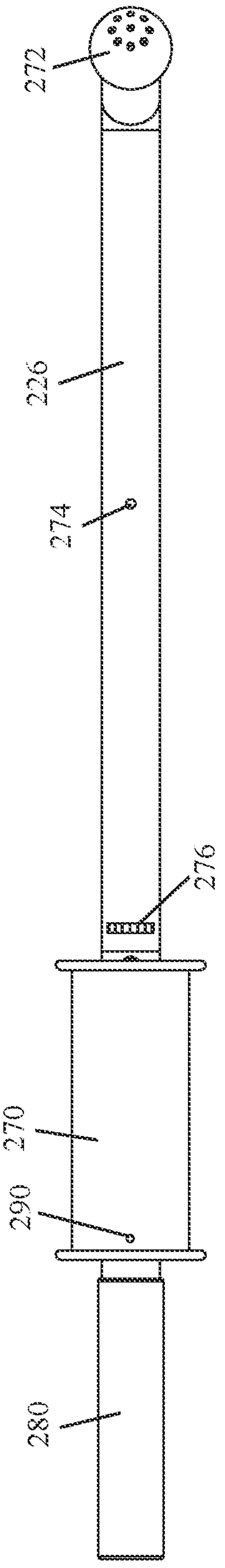
Figure 32:
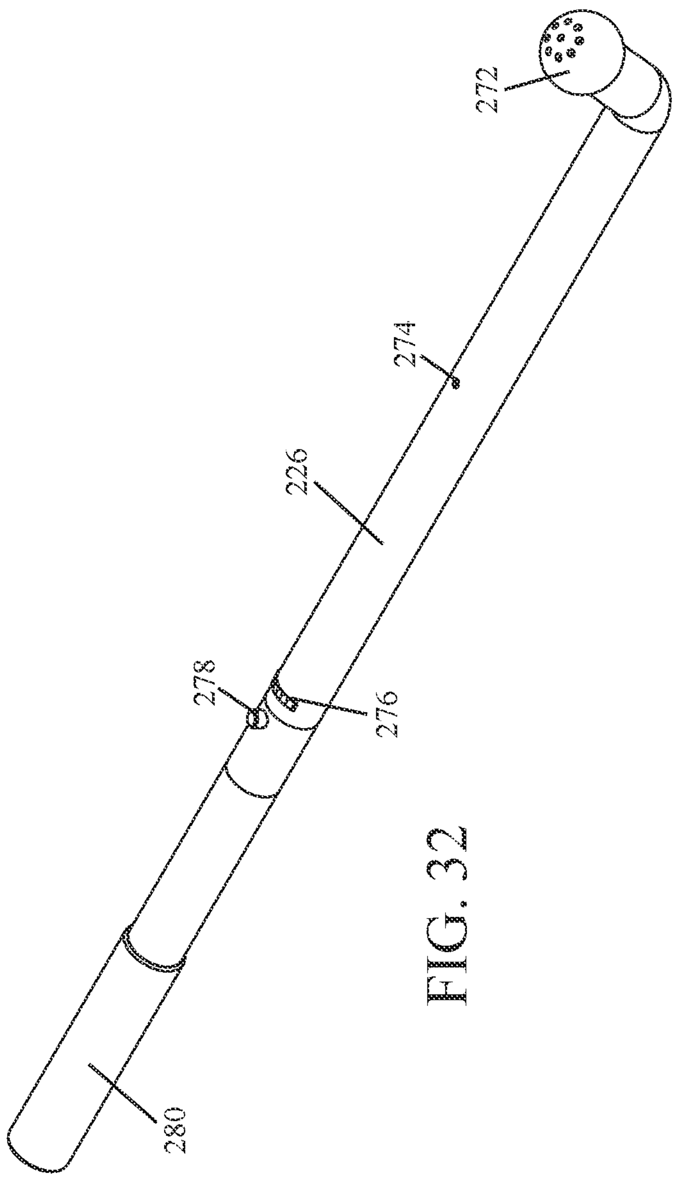
FIGS. 32 and 33 illustrate the digital stimulation device shown in FIGS. 30 and 31 without the handle attached.
Figure 33:
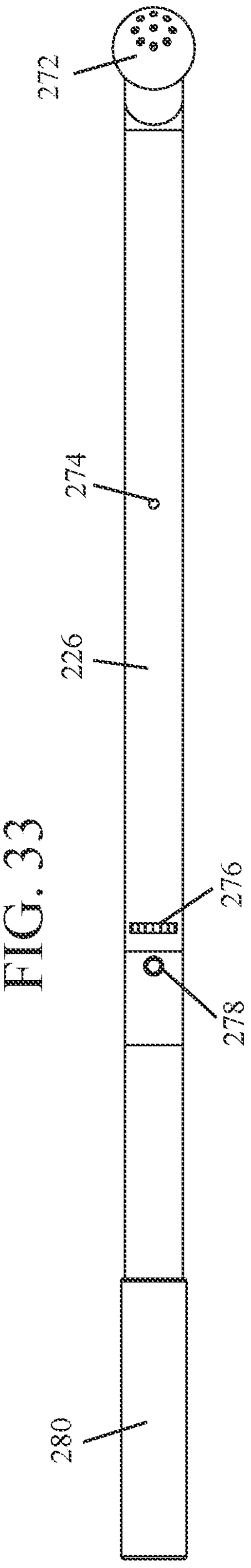

As shown in FIGS. 20 and 30-31, in some implementations, the digital stimulation device 226 may also comprise a temperature indicating strip 276, an ON/OFF valve switch 278 that is actuated using the handle 270, a high-temperature shut-off valve 280, or a combination thereof.

In some implementations, the temperature indicating strip 276 allows a user to monitor water temperature. This provides a visual indication of water temperature for individuals that lack, or have impaired, thermal sensation. Also, the user is able to determine if the water temperature is within an effective range (i.e., a temperature range suitable for inducing a bowel movement). While a temperature indicating strip 276 is shown, it should be understood that another suitable thermometer could be used instead.

Figure 34:
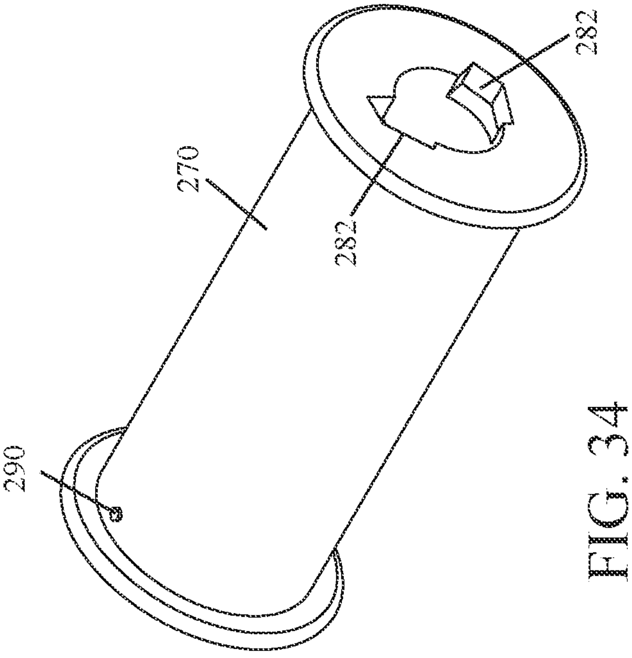
FIG. 34 illustrates the handle of the digital stimulation device shown in FIGS. 30 and 31.
Figure 35:
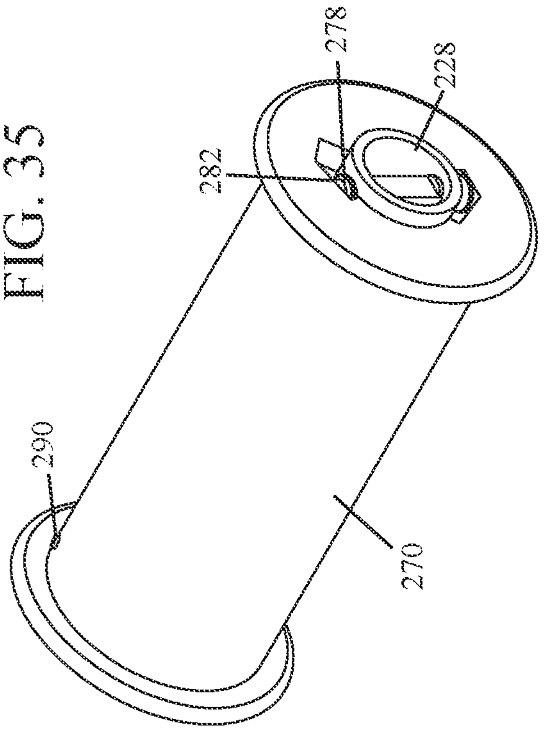
FIG. 35 illustrates an isometric view of the handle and the ON/OFF valve switch of the digital stimulation device shown in FIGS. 30 and 31.
Figure 36:
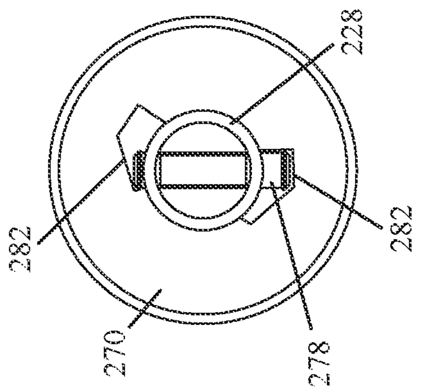
FIG. 36 illustrates a front view of the handle and the ON/OFF valve switch shown in FIG. 35.

In some implementations, the ON/OFF valve switch 278 can be actuated using the handle 270. The handle 270 is configured to rotate about the shaft 228 of the digital stimulation device 226 and includes camming surfaces 282 within an interior cavity thereof (e.g., FIG. 34). The handle 270 is configured such that its rotation causes the camming surfaces 282 to open or close the ON/OFF valve switch 278 (e.g., FIGS. 35 and 36).

In some implementations, the high-temperature shut-off valve 280 is configured to shut off water flow to the digital stimulation device 226 if the water temperature becomes too hot. In this way, the user may be protected from scalding water. During normal operation the valve 280 is fully open. If the water temperature reaches a set threshold (e.g., 100° F.), a thermal element within the shut-off valve 280 begins to close the inlet orifice. One of ordinary skill in the art, having the benefit of the present disclosure, would be able to select an appropriate high-temperature shut-off valve for use as part of a digital stimulation device 226.

Figure 37:
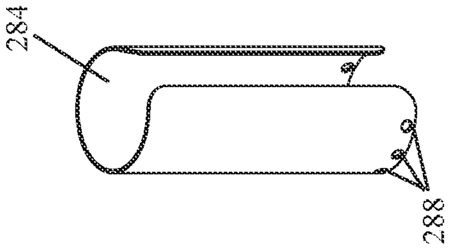
FIGS. 37 and 38 illustrate an example splint attachment bracket that can be attached to the handle of the digital stimulation device shown in FIG. 30.
Figure 38:
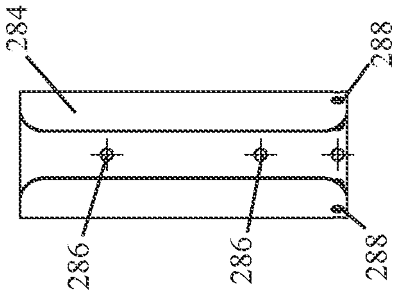
Figure 39:
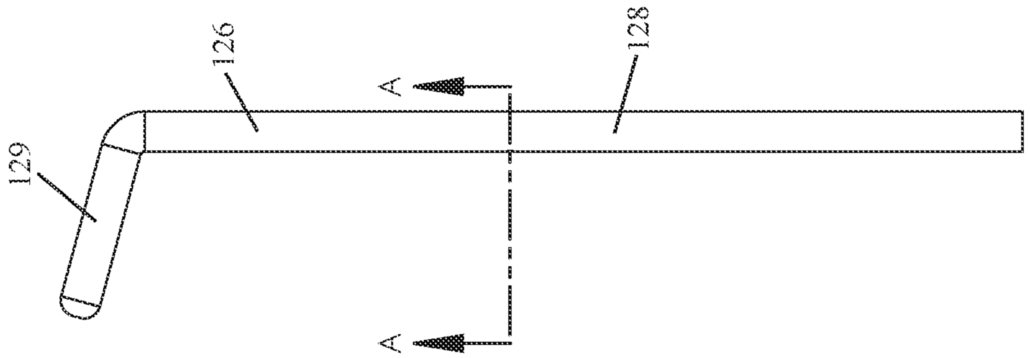
FIG. 39 illustrates an example digital stimulation device used to induce a bowel movement.

As shown in FIG. 20, in some implementations, a splint attachment bracket 284 may be secured to the handle 270 of the digital stimulation device 226. Thermoplastic splinting material can be shaped and attached to the splint attachment bracket 282. As shown in FIGS. 37 and 38, the splint attachment bracket 284 has a C-shaped side-profile and is configured to fit about the exterior of the digital stimulation device's handle 270. The splint attachment bracket 284 includes a plurality of locating holes 288 adapted to receive the locating pin 290 on the handle 270. In this way, the splint attachment bracket 284, and any attachments, can be oriented as desired and kept from rotating about the handle 270. In some implementation, the splint attachment bracket 284 includes openings 286 that can be used to anchor a hand splint in position. In some implementations, the splint attachment bracket 284 may also be used to attach a loop handle to the digital stimulation device's handle 270 (not shown).

Figure 42:
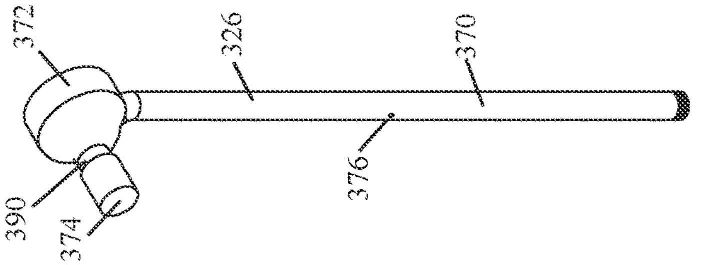
FIGS. 42 and 43 illustrate yet another example digital stimulation device used to induce a bowel movement.
Figure 43:
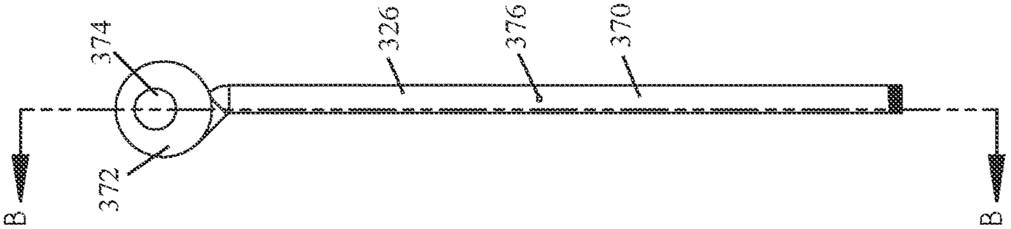
Figure 44:
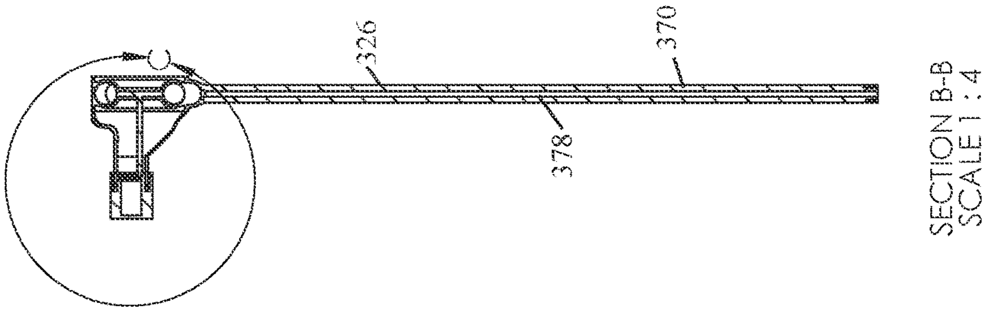
FIG. 44 illustrates a cutaway view of the digital stimulation device taken along lines B-B shown in FIG. 43.
Figure 45:
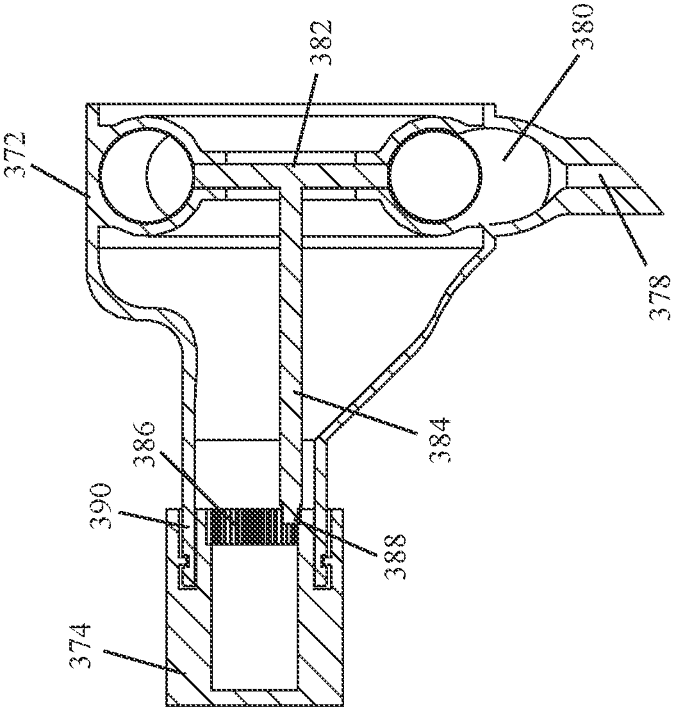
FIG. 45 illustrates an enlarged view of a portion of the digital stimulation device shown in FIG. 44.

FIGS. 42-44 illustrate yet another example digital stimulation device 326 according to the principles of the present disclosure. The digital stimulation device 326 is similar to the digital stimulation devices 126, 226 discussed above but comprises a handle 370 connected to a head 372 having a nose 390 configured to rotate a stimulation attachment (e.g., 330, 340, 350) affixed thereto. Various stimulation attachments 330, 340, 350 can be secured to the nose 390 of the digital stimulation device 326 and used to induce a bowel movement. Each stimulation attachment 330, 340, 350 includes a base that can be removably affixed to the distal end of the nose 390 (see e.g., the exemplary base 374 shown in FIG. 45). A water turbine housed within the head 372 powers the rotation of a connected stimulation attachment. But, in some implementations, an electric motor could be used in lieu of the water turbine. The handle 370 includes a conduit 378 through which water travels from its source to the water turbine. The handle 370 includes two locating holes 376 therein. In some implementations, as shown best in FIG. 45, the water turbine of the digital stimulation device 326 comprises a penstock 380 used to regulate the flow of water to a rotary vane pump 382 configured to turn a drive shaft 384 operably connected to the base of a stimulation attachment (see e.g., the exemplary base 374 shown in FIG.

45). The base of a stimulation attachment is rotatably secured to the nose 390 of the head 372. In some implementations, an exemplary base 374 of a stimulation attachment includes a ring gear 386 that is in operational contact with a spur gear 388 on the distal end of the drive shaft 384 (see, e.g., FIG. 45). In this way, the drive shaft 384 is able to turn the ring gear 386 and thereby cause the base 374, and the stimulation attachment as a whole, to spin. A water supply from a sink faucet, or other pressurized source, is supplied via a hose attached to the handle 370 of the digital stimulation device 326 (not shown). One of ordinary skill in the art, having the benefit of the present disclosure, could select a connector suitable for joining a hose to the digital stimulation device 326.

Figure 47:
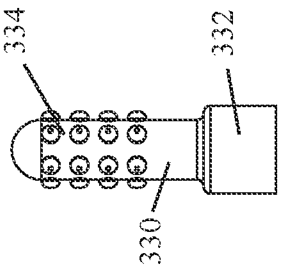
FIGS. 46 and 47 illustrate an example stimulation attachment for use with the digital stimulation device shown in FIG. 42.
Figure 46:
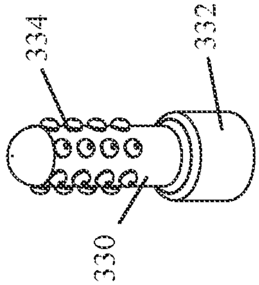

FIGS. 46 and 47 illustrate an example stimulation attachment for use with the digital stimulation device 326 shown in FIGS. 42-45. In some implementations, the stimulation attachment 330 comprises a base 332 (the same as, or at least similar to, the exemplary base 374 described above) and a textured insertion tip 334. The base 332 of the stimulation attachment 330 is adapted so that it can be removably affixed to the nose 390 of the digital stimulation device 326. The texture insertion tip 334 includes an array of rounded bumps thereon. The stimulation attachment 330 can be attached to the head 372 and inserted into the rectum. Using the digital stimulation device 326, the stimulation attachment 330 can be made to spin. This circular motion causes the anal sphincter and bowel muscles to relax and, in turn, allows stool to leave the body.

FIGS. 48 and 49 illustrate another example stimulation attachment 340 according to the principles of the present disclosure. The stimulation attachment 340 is similar to the stimulation attachment 330 discussed above but comprises a base 342 and a smooth insertion tip 344. The insertion tip 344 is offset from the base's 342 axis of rotation. During use, the offset insertion tip 334 moves through an orbital path relative to the base's 342 axis of rotation.

FIGS. 50 and 51 illustrate yet another example stimulation attachment 350 according to the principles of the present disclosure. The stimulation attachment 340 is similar to the stimulation attachments 330, 340 discussed above but comprises a base 352 and an angled insertion tip 344.

Figure 53:
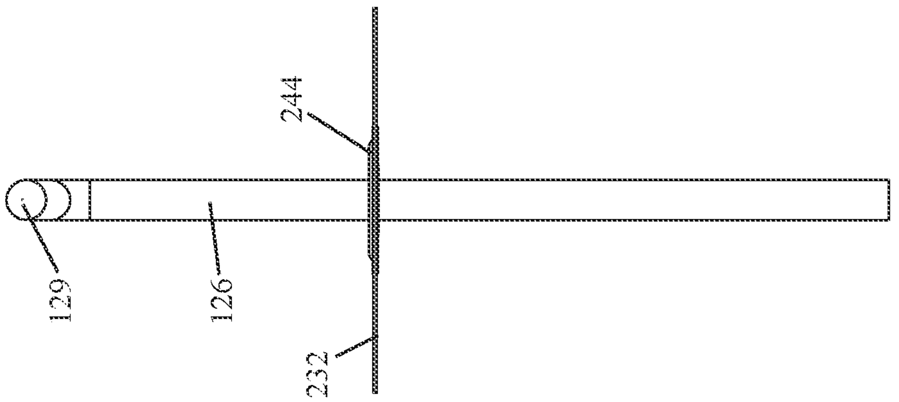
FIGS. 52 and 53 illustrate a flexible diaphragm positioned within an opening in the splash guard of a seat being used to support a digital stimulation device.
Figure 52:
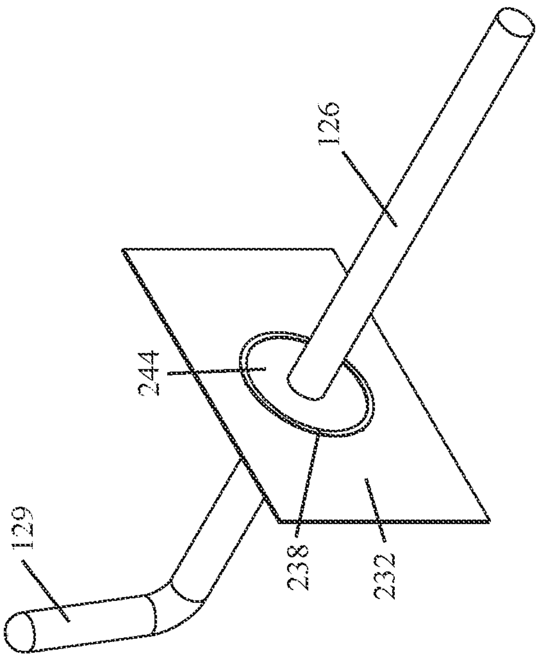
Figure 55:
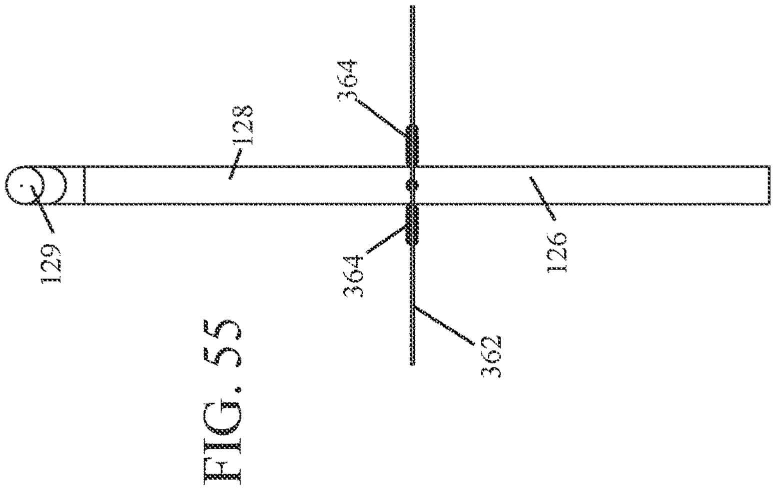
FIGS. 54-56 illustrate springs positioned within an opening in the splash guard of a seat being used to support a digital stimulation device.
Figure 56:
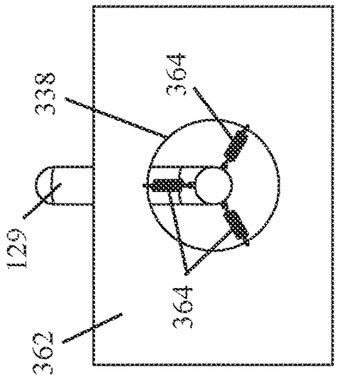
Figure 54:
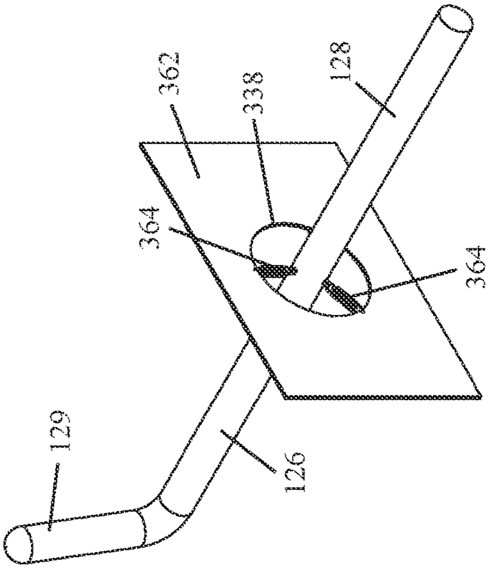

FIGS. 52 and 53 illustrate a flexible diaphragm 244 positioned within an example opening 238 in the splash guard 232 of a seat. The flexible diaphragm 244 is configured to support a digital stimulation device 126 and can be used in lieu of a sliding-pivot assembly 142. The diaphragm 244 is made of a flexible material, such as rubber. The flexible diaphragm 244 positions the angled insertion tip 129 of the digital stimulation device 126 below the waste elimination opening 130 in a seat. Further, the flexible diaphragm 244 is adapted so the angled insertion tip 129 of the digital stimulation device 126 can be inserted into the rectum and moved in a circular motion by the user to induce a bowel movement.

FIGS. 53-56 illustrate three springs 364 positioned within an example opening 338 in the splash guard 362 of a seat. The springs 364 are configured to support a digital stimulation device 126 and can be used in lieu of a sliding-pivot assembly 142 or a flexible diaphragm 244. The first end of each spring 364 is anchored to the interior edge of the opening 338 in the splash guard 262 and the second end of each spring 364 is attached to the shaft 128 of the digital stimulation device 126. The springs 364 position the angled insertion tip 129 of the digital stimulation device 126 below the waste elimination opening 130 in a seat. Further, the springs 364 allow the angled insertion tip 129 of the digital stimulation device 126 to be inserted into the rectum and moved in a circular motion by the user to induce a bowel movement.

FIGS. 57-61 illustrate another example frame 202, seat 306, and periscope 234 for the commode wheelchair 100.

As shown in FIGS. 57-61, the frame 202 is similar to the frame 102 discussed above, but this frame 202 includes a bracket 208 configured to support a digital stimulation device 126, 226, 326. The bracket 208 is secured directly to the frame 202 and includes an opening 238 that extends therethrough. Further, the bracket 208 extends down from an upper portion 202*a* of the frame 202. As shown, the bracket opening 238 can support the shaft of a digital stimulation device 126 and serve as a pivot point during use. In some implementations, the bracket opening 238 is the same as the opening 138 in the splash guard 132 discussed above and shown in FIGS. 12-15. Correspondingly, such an implementation of the bracket opening 238 is configured so that the sliding-pivot assembly 142, holding a digital stimulation device (126, 226, 326), can be attached thereto.

Figure 57:
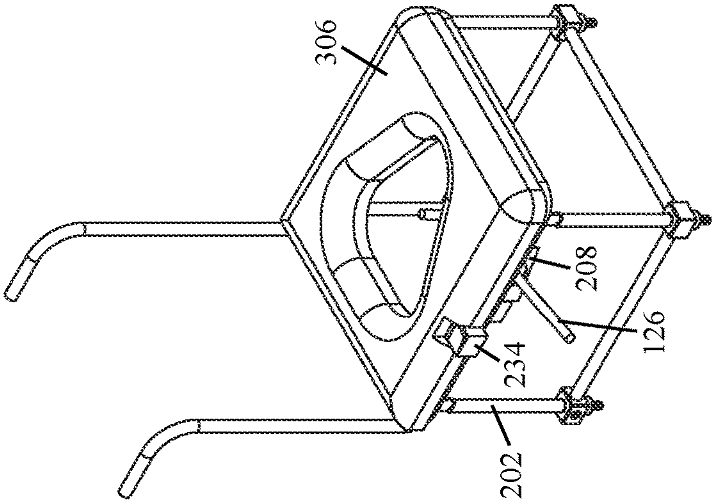
FIG. 57 illustrates an isometric view of another example frame and seat for the commode wheelchair shown in FIG. 1, wherein the backrest, wheels, and casters have been omitted for the sake of clarity.
Figure 58:
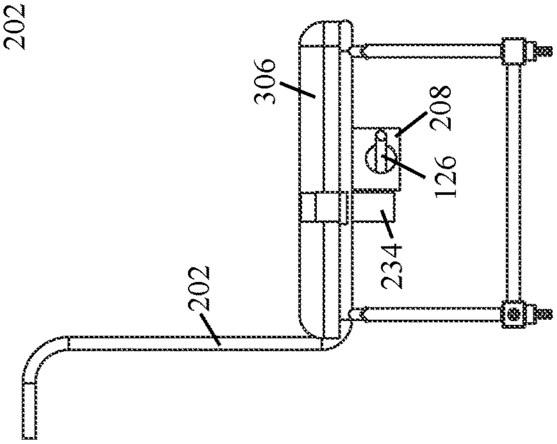
FIG. 58 illustrates a side view of the frame and seat shown in FIG. 57.
Figure 59:
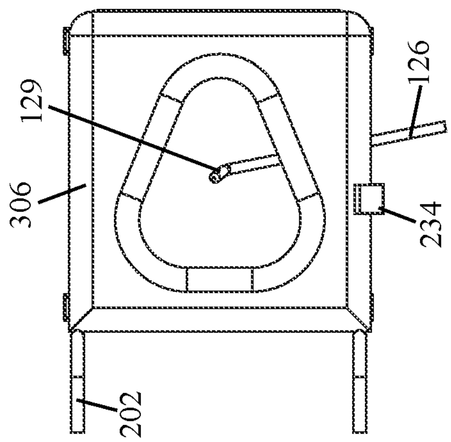
FIG. 59 illustrates a top view of the frame and seat shown in FIG. 57.
Figure 60:
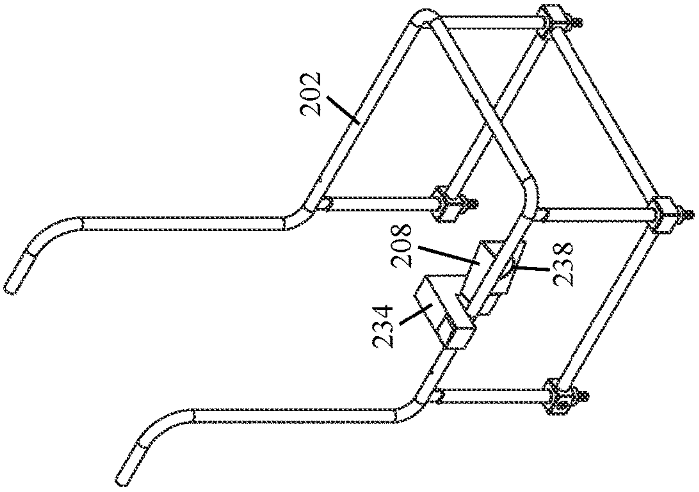
FIG. 60 illustrates another isometric view of the example frame shown in FIG. 57, wherein the seat has been removed.
Figure 61:
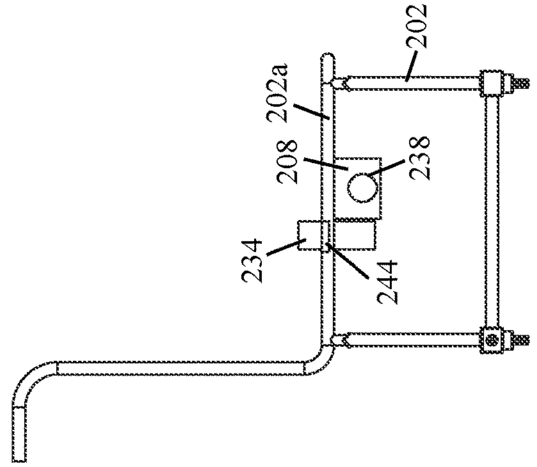
FIG. 61 illustrates a side view of the frame shown in FIG. 60.
Figure 62:
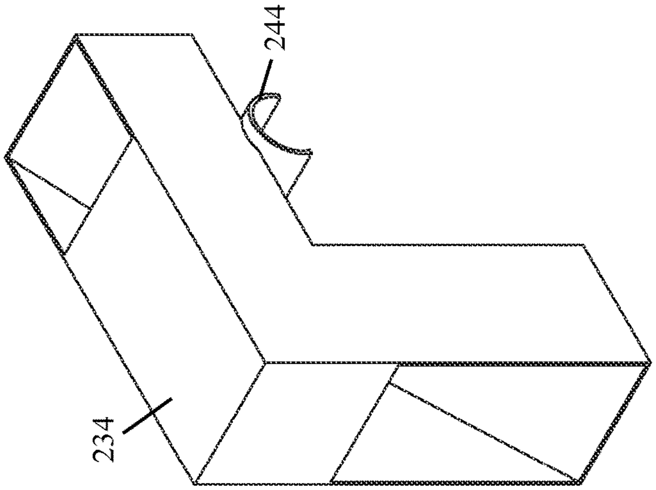
FIG. 62 illustrates an isometric view of another example periscope that can be attached to the frame of the commode wheelchair shown in FIG. 57.
Figure 63:
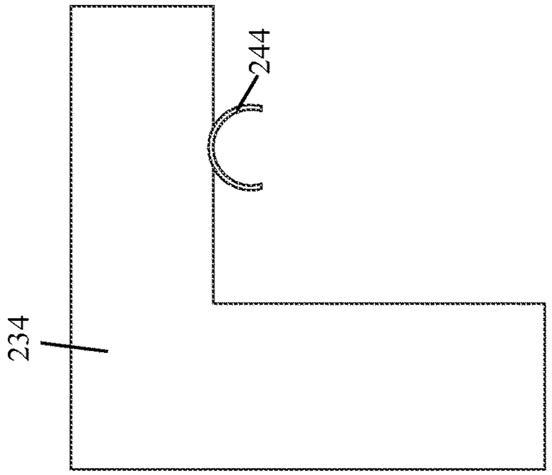
FIG. 63 is a side view of the periscope shown in FIG. 62.

Likewise, as shown in FIGS. 57-59, the seat 306 is similar to the seats 106, 206 discussed above, but this seat 306 does not include a splash guard 132 or have a periscope attached thereto.

As shown in FIGS. 60-63, the periscope 234 is similar to the periscope 134 discussed above and shown in FIGS. 16-18, but this periscope 234 can be secured directly to the frame 202. More specifically, in some implementations, the periscope 234 includes a C-shaped clamp 244 used to secure the periscope 234 to a cylindrical portion of the frame 202. In other implementations, the periscope 234 may be welded to the frame 202.

Although not shown in the drawings, it should be understood that in some implementations, the commode wheelchair 100 may not include wheels 108 or casters 110. Such an implementation would be referred to as a commode chair.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A commode chair configured to be positioned over a toilet bowl to enable a person with a disability to use a toilet, the commode chair comprising:

a seat comprising a waste elimination opening and a splash guard, the waste elimination opening is located in a central portion of the seat beneath where the person sits, and the splash guard comprises a sidewall positioned around the waste elimination opening that depends from an underside of the seat;

wherein:

the sidewall of the splash guard includes an opening with a flexible diaphragm positioned therein; the flexible diaphragm is configured to support a digital stimulation device; and the digital stimulation device includes a shaft that extends through and is supported by the flexible diaphragm.

2. The commode chair of claim 1, wherein the digital stimulation device also includes an angled insertion tip adapted for insertion into a rectum.

3. The commode chair of claim 1, wherein the digital stimulation device comprises the handle connected to a head with a nose configured to rotate a stimulation attachment affixed thereto; the stimulation attachment is configured for insertion into a rectum, where it is used to induce a bowel movement, and includes a base removably affixed to the nose of the digital stimulation device.

4. A commode chair configured to be positioned over a toilet bowl to enable a person with a disability to use a toilet, the commode chair comprising:

a seat comprising a waste elimination opening and a splash guard, the waste elimination opening is located in a central portion of the seat beneath where the person sits, and the splash guard comprises a sidewall positioned around the waste elimination opening that depends from an underside of the seat;

a digital stimulation device used to induce a bowel movement, the digital stimulation device comprising a shaft having a working end portion; and a sliding-pivot assembly configured to hold the digital stimulation device by the shaft, the sliding-pivot assembly comprising a cylindrical body with a sliding-pivot mounted within an interior of the cylindrical body, the sliding-pivot is configured to secure about the shaft of the digital stimulation device;

wherein:

the sidewall of the splash guard includes an opening configured so that the sliding-pivot assembly can be attached thereto; and the sliding-pivot assembly is configured to: position the working end portion of the digital stimulation device underneath the waste elimination opening of the seat, allow the user to insert the working end portion of the digital stimulation device into a rectum, and to move the digital stimulation device in a manner that will induce a bowel movement.

5. The commode chair of claim 4, wherein the sliding-pivot of the sliding-pivot assembly comprises a C-shaped body that includes two curved branches, each of the two curved branches includes a locating pin adapted to be received within a locating hole found in the shaft of the digital stimulation device.

6. The commode chair of claim 4, wherein the working end portion of the digital stimulation device includes an angled insertion tip adapted for insertion into the rectum.

7. The commode chair of claim 4, wherein the digital stimulation device is configured to spray water, the working end portion of the digital stimulation device is an angled spray head, and the digital stimulation device includes a handle secured to the shaft.

8. The commode chair of claim 4, wherein the working end portion of the digital stimulation device comprises a head having a nose configured to rotate a stimulation attachment affixed thereto, the stimulation attachment is used to induce a bowel movement and includes a base removably affixed to the nose of the digital stimulation device.

9. A commode chair configured to be positioned over a toilet bowl to enable a person with a disability to use a toilet, the commode chair comprising:

a frame that includes a bracket;

a seat resting on the frame, the seat comprising a waste elimination opening, the waste elimination opening is in a central portion of the seat beneath where the person sits;

a digital stimulation device used to induce a bowel movement, the digital stimulation device comprising a shaft having a working end portion; and a sliding-pivot assembly configured to hold the digital stimulation device by the shaft, the sliding-pivot assembly comprising a cylindrical body with a sliding-pivot mounted within an interior of the cylindrical body, the sliding-pivot is configured to secure about the shaft of the digital stimulation device;

wherein:

the bracket is positioned underneath the seat, depends from a portion of the frame on which the seat rests, and includes an opening configured to allow attachment of the sliding-pivot assembly;

the sliding-pivot assembly is configured to: position the working end portion of the digital stimulation device underneath the waste elimination opening of the seat, allow the user to insert the working end portion of the digital stimulation device into a rectum, and to move the digital stimulation device in a manner that will induce a bowel movement.

10. The commode chair of claim 9, wherein the digital stimulation device also includes an angled insertion tip adapted for insertion into the rectum.

* * * * *